Feb. 19, 1924.

O. S. PRIDGEN

MARINE VEHICLE

Filed Oct. 2, 1923

Witnesses:
A. L. Fox,

Otto S. Pridgen,
Inventor

By Clarence A. O'Brien
Attorney

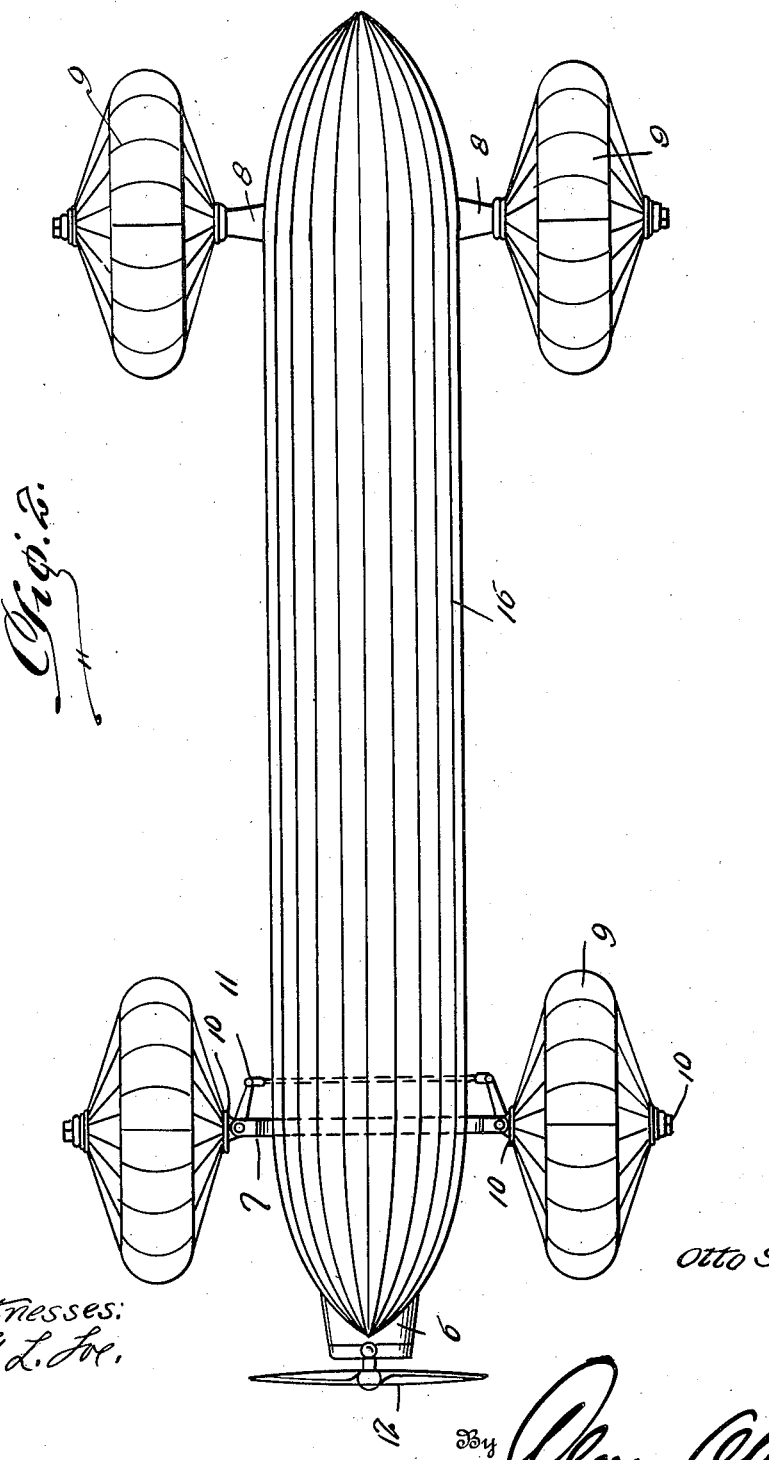

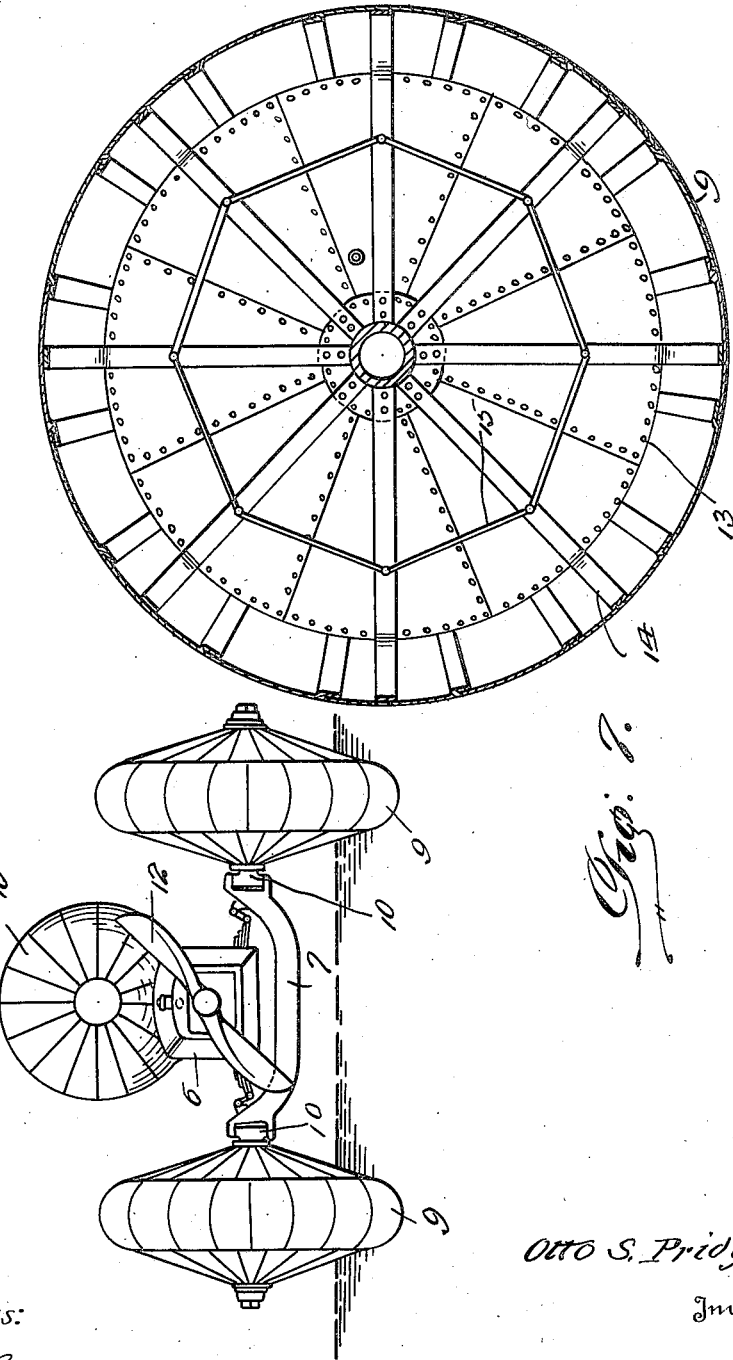

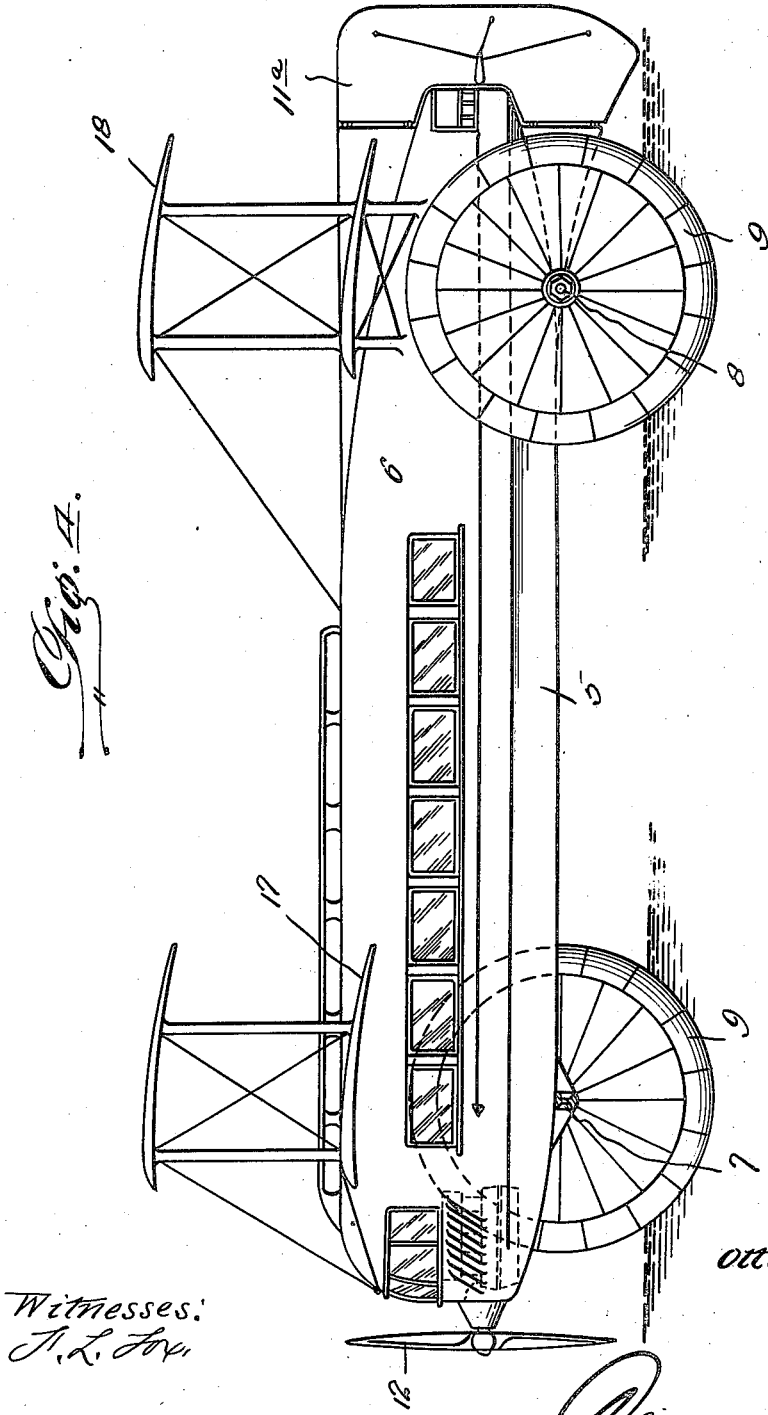

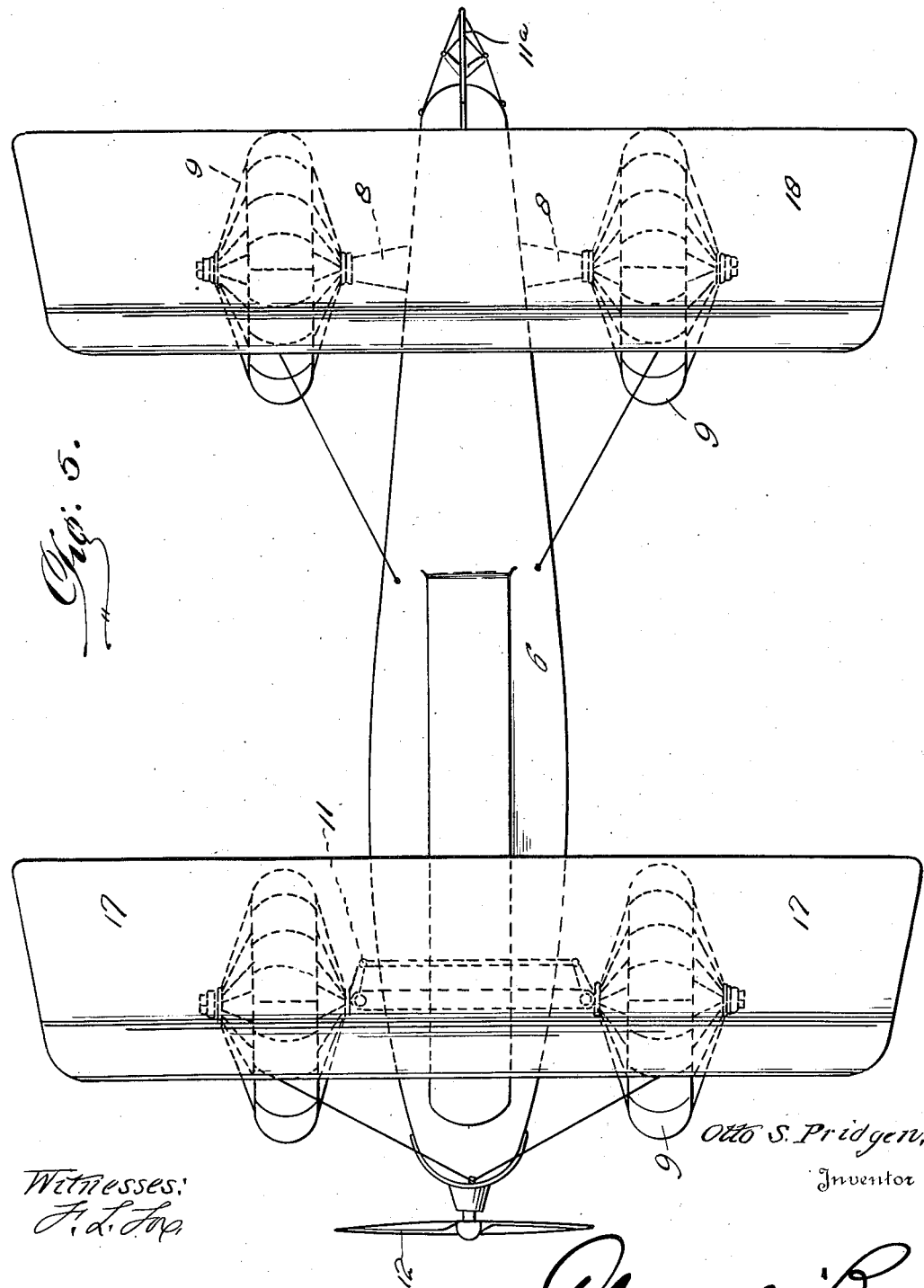

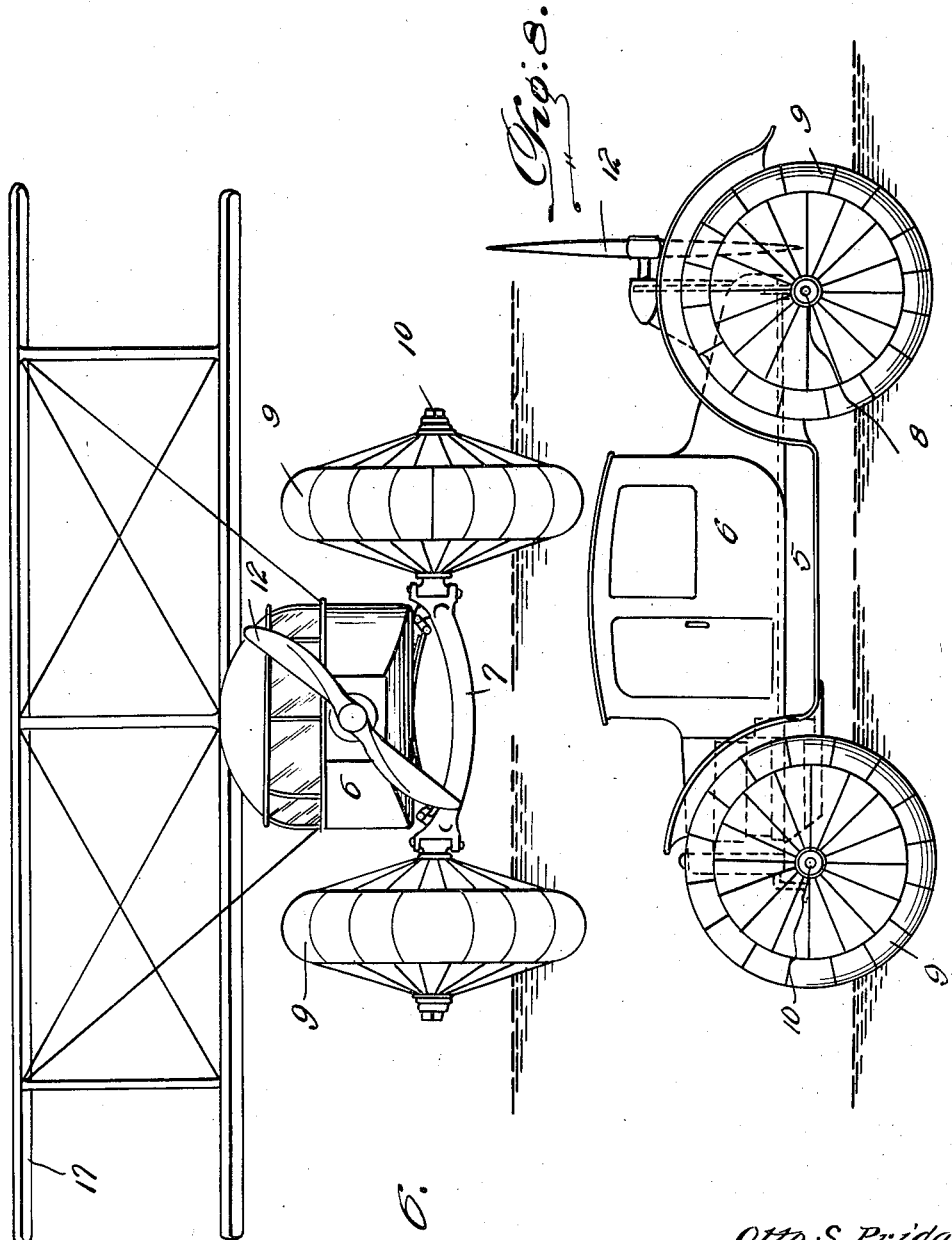

Patented Feb. 19, 1924.

1,484,410

UNITED STATES PATENT OFFICE.

OTTO S. PRIDGEN, OF RICHMOND, VIRGINIA.

MARINE VEHICLE.

Application filed October 2, 1923. Serial No. 666,163.

*To all whom it may concern:*

Be it known that I, OTTO S. PRIDGEN, citizen of the United States, residing at Richmond, in the county of Henrico and State of Virginia, have invented certain new and useful Improvements in Marine Vehicles, of which the following is a specification.

This invention relates to what may be termed a marine vehicle, and has particular reference to the provision of a device adapted to travel upon the water in such manner that the water offers little resistance to the travelling movement thereof whereby the device may attain a very high speed.

An object of the invention is to provide a marine vehicle of the above kind, embodying an enclosed hull adapted to be normally sustained above the surface of the water by means of floats in the form of hollow air tight supporting wheels, the body or hull construction being such as to insure the same floating upon the water should the rotatable float wheels become damaged or broken.

Another object of the invention is to provide means independent of the smooth surface float wheels for causing the forward travelling movement of the vehicle and to assist in sustaining the weight of the body, whereby at a predetermined high speed of travel, the float wheels will be so slightly submerged in the water as to offer little resistance to the forward travelling movement of the vehicle.

Another object of the invention is to carry out the above features and objects in a simple and practical manner, whereby the invention may meet with all of the requirements for a successful commercial use and wherein durability is insured, and the safety of the passengers properly accounted for.

Still another object of the invention is to adapt the same to both of the requirements of commercial and pleasure conditions.

Other objects will appear as the nature of the invention is better understood, and the same consists in the novel form, combination and arrangement of parts hereinafter more fully described, shown in the accompanying drawings, and claimed.

In the drawings, wherein like reference characters indicate corresponding parts throughout the several views:

Figure 2 is a top plan view of the device shown in Figure 1.

Figure 3 is a front elevational view of the device shown in Figure 1.

Figure 4 is a view similar to Figure 1 of a modified form of the invention which will be found more desirable and serviceable in and about smaller bodies of water.

Figure 5 is a top plan view of the device shown in Figure 4.

Figure 6 is a front elevational view of the device shown in Figure 4.

Figure 7 is a longitudinal central vertical sectional view through one of the wheel floats, and Figure 8 is a side elevational view of the modified form of the invention particularly adaptable for pleasure purposes on very small bodies of water or in and around beaches or the like.

Figure 1:
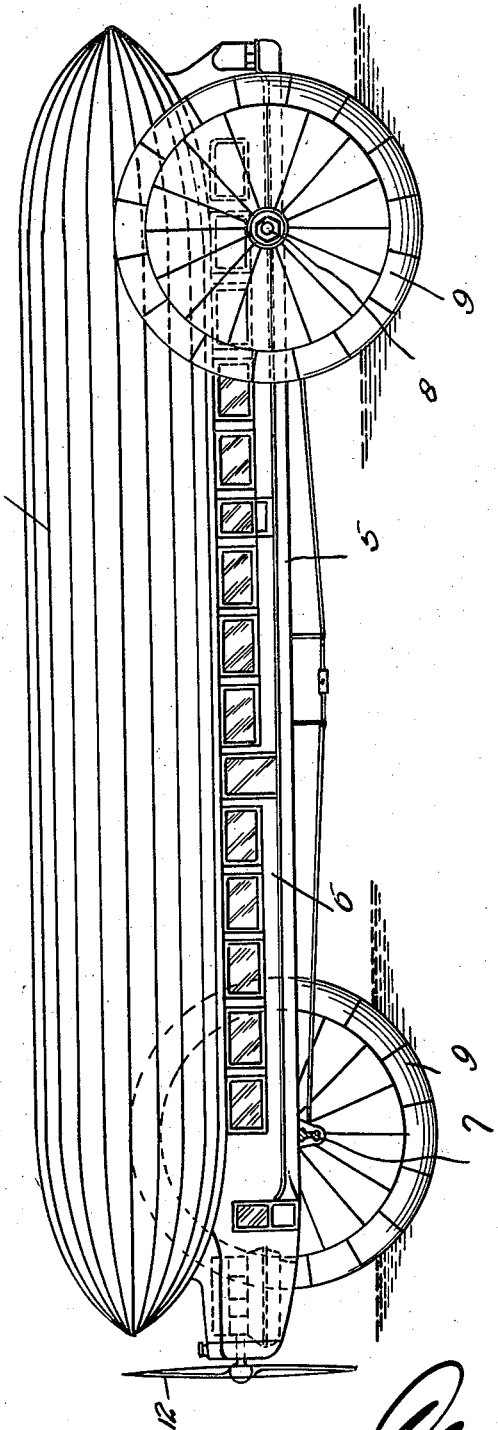
Figure 1 is a somewhat diagrammatic side elevational view, showing the invention applied to a lighter than air craft adapted to be constructed in extremely large sizes for navigating upon relatively large bodies of water and to be used for commercial purposes, such as the transportation of numerous passengers and freight.

Referring more in detail to the drawings, the invention broadly embodies the provision of a floatable hull 5 having the upper portion thereof in the form of an enclosed body 6 and adapted to float upon the water and to be constructed at its lower portion similar to the construction now practiced in connection with the hulls of vessels, boats or the like, generally speaking. In each form of the invention, the hull 5 is provided with front transverse axles 7 and a rear transverse axle 8 upon the ends of which are rotatably mounted floats 9 in the nature of hollow air tight wheels. The front axles 7 are provided upon their ends with swinging stub axles 10 upon which the front float wheels are journalled, and which are adapted to be swung in a horizontal plane similar to the front steering wheels of an automobile for steering purposes, the steering mechanism employed being of a well known form being of the steering arms and connections as generally indicated at 11, that are operated by suitable means such as a steering shaft extending through the bottom of the hull 5 and having a steering wheel thereon within the enclosed body 6. The front float wheels 9 may thus be turned at a desired angle to the longitudinal axis of the body or hull, for determining the course travelled by the vehicle, but it is obvious that in case it is found convenient or necessary for assisting in the steering, that a rear rudder may be provided, as indicated at 11, such rudder to be constructed and actuated similar to the vertical tail rudder of an aeroplane. This rudder is only shown in connection with the form of the invention shown in Figures 3 and 4, but it is obvious that it may be applied to the other forms of the invention.

The float wheels 9 are to be constructed of such size and displacement as to support the bottom of the hull 5 normally above the surface of the water as shown in several of the views, and the forward travelling movement is imparted to the vehicle by means of a vertical screw propeller 12 constructed and operated similar to the propellers employed upon aeroplanes now in use. Preferably the power plant for operating the propeller 12 is arranged adjacent the end at which said propeller is mounted, and within the body of the vehicle as indicated in outline by dotted lines in Figures 1 and 4. As shown in Figure 7, the float wheels 9 are preferably constructed of numerous sheet metal plates rigidly joined together by soldering and riveting or the like as indicated at 13, and said wheels are internally reinforced by means of radial and tangential braces 14 and 15 respectively. The peripheries or rims of the float wheels are perfectly smooth externally and preferably convex so as to reduce friction to a minimum, and to allow free rolling thereof on the water. The float wheels may be filled with air or gas for obvious reasons, and in connection with the larger vehicles, the propellers 12 are preferably disposed at the forward ends of the hull or body.

In the form of the invention shown in Figures 1 to 3 inclusive, the weight is only partially sustained by means of the float wheel 9, the major portion of such weight being sustained by means of a long gas bag 16 disposed above the body 6 similar to the construction of lighter than air aircraft now in use. In other words, the invention shown in Figure 1 consists in applying the float wheels to the structure somewhat similar to that commonly known now as a "zeppelin" the body 6 thereof being of very large proportion so as to accommodate a great number of passengers and even freight. Due to the extreme weight of the body in this form of the invention, the air bag or container 16 is required so as to prevent submerging of the float wheel 9 to an undue extent.

In the form of the invention shown in Figures 4 to 6 inclusive, the body and hull are made of smaller size, and are provided at the upper portions thereof with tandem pairs of superposed planes or laterally extending wings 17 and 18 designed to assist in sustaining the weight to a great degree upon the vehicle attaining a certain speed of travel so that the float wheels will at this time be only slightly submerged and substantially having a rolling contact upon the surface of the water when the vehicle is travelling at its maximum speed. In other words, the device in Figures 4 to 6 inclusive constitutes a tandem by-plane with a boat hull and an enclosed body that is provided with floats in the form of rotatable supporting wheels.

The vehicle in the form of the invention shown in Figure 1, constitutes a screw propelled passenger carrying balloon of elongated form and having a boat hull provided with an enclosed body, the hull being mounted upon supporting wheels in the form of rotatable floats. In both the form of the invention shown in Figure 1, and the form of invention shown in Figure 4, means is provided for assisting the rotatable supporting wheel float in sustaining the weight of the hull and body and the passengers or freight therein so that when the vehicle is travelling at normal speed, said wheels will only be slightly submerged for offering slight resistance to the travelling movement of the vehicle and substantially rolling upon the surface of the water.

In the form of the invention shown in Figure 8, the construction is identical in essential respects to that described above with respect to the other forms of the invention, except that the body is made relatively small and similar to the body of a closed automobile, the bottom of the body being however, constructed in the form of a hull adapted to float upon the water in case the rotatable float wheels should become damaged. In this form of the invention it is not necessary to provide means such as the air bag 16 or wings 18 to assist the float wheels in supporting the weight of the body because said wheels may be made sufficiently large for this purpose without a great displacement. Also, this form of the invention being particularly adaptable for pleasure purposes, the propeller 12 is placed, together with its power plant at the rear of the body so as to not obstruct the view of the passengers. In all forms of the invention, the front steering wheel floats are utilized for controlling the course of travel of the vehicle.

From the above description, it is believed that the construction and operation as well as the advantages of the invention will be readily understood and appreciated by those skilled in the art.

Minor changes may be made without departing from the spirit and scope of the invention as claimed.

What I claim as new is:

A marine vehicle including a floatable hull adapted to provide passenger and freight carrying compartments, floatable supporting wheels rotatably mounted on the hull for supporting the same for movement over the ground or the surface of the water, means for effecting the movement of the vehicle, said supporting wheels being formed of side plates arranged in spaced relation, said side plates being formed of a plurality of interconnected radially extending plates, a tread portion of curved section connecting said side plates, said tread portion being composed of a plurality of interconnected arcuate plates, whereby an enclosed floatable body is formed by the side plates and the tread portion, radial supporting sections mounted within the wheel body and engaggaging the tread portion and spacing elements secured to the supporting sections between said side plates and adjacent the outer periphery thereof for holding said sections in spaced relation.

In testimony whereof I affix my signature.

OTTO S. PRIDGEN.